United States Patent [19]

Sebenik et al.

[11] Patent Number: 4,547,345

[45] Date of Patent: Oct. 15, 1985

[54] RECOVERY OF MOLYBDENUM FROM SPENT CATALYST SOLUTIONS OBTAINED FROM HYDROPEROXIDE EPOXIDATIONS

[75] Inventors: Roger F. Sebenik; Jerry D. Baker, both of Ann Arbor, Mich.; John M. Laferty, Wheatridge, Colo.

[73] Assignee: AMAX Inc., Greenwich, Conn.

[21] Appl. No.: 589,387

[22] Filed: Mar. 14, 1984

[51] Int. Cl.[4] .............................................. C01G 39/00
[52] U.S. Cl. ......................................... 423/53; 75/121
[58] Field of Search ..................... 75/84, 121; 502/34, 502/53; 423/53

[56] References Cited

U.S. PATENT DOCUMENTS

| | | | |
|---|---|---|---|
| 2,985,580 | 5/1961 | Heinemann | 502/53 |
| 3,211,668 | 10/1965 | Yamamoto | 502/34 |
| 4,425,255 | 1/1984 | Toyoda et al. | 502/53 |

FOREIGN PATENT DOCUMENTS

| | | | |
|---|---|---|---|
| 0151764 | 11/1981 | German Democratic Rep. | 502/53 |
| 55-67335 | 5/1980 | Japan | 502/34 |
| 484962 | 5/1938 | United Kingdom | 502/53 |
| 1158418 | 7/1969 | United Kingdom | 502/53 |

OTHER PUBLICATIONS

Asinger, "Paraffins", Pergamon Press, N.Y., 1968, pp. 93–100 cited.

*Primary Examiner*—H. T. Carter
*Attorney, Agent, or Firm*—Michael A. Ciomek; Eugene J. Kalil

[57] ABSTRACT

Molybdenum is recovered from an organic material, such as a spent epoxidation catalyst, by heating the material in a stream of non-oxidizing gas at a temperature of at least about 400° C. to evolve the organic in the gas stream from which it is recovered and to leave a powdery residue containing essentially all of the molybdenum.

6 Claims, 1 Drawing Figure

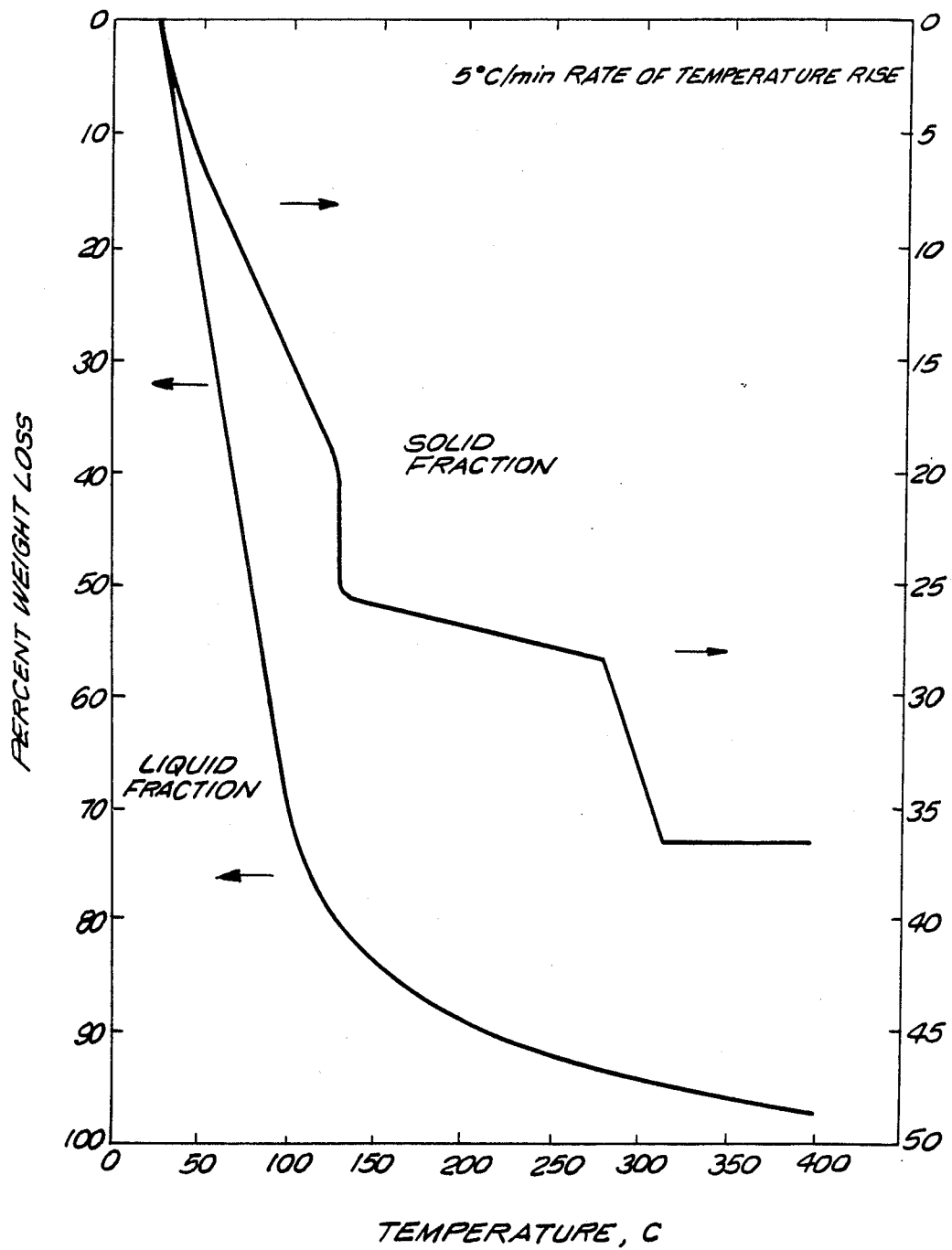
THERMOGRAVIMETRIC ANALYSIS (TGA) OF SOLID FRACTION AND LIQUID FRACTION OF A SPENT Mo CATALYST MATERIAL

RECOVERY OF MOLYBDENUM FROM SPENT CATALYST SOLUTIONS OBTAINED FROM HYDROPEROXIDE EPOXIDATIONS

The present invention is directed to the recovery of spent molybdenum catalyst from an organic solution such as that resulting from the hydroperoxide epoxidation of an olefinic hydrocarbon.

BACKGROUND OF THE INVENTION AND THE PRIOR ART

It is known that molybdenum is an active catalyst for important epoxidation reactions conducted upon olefins containing 3 to 18 carbon atoms. As an example, propylene oxide produced by the hydroperoxide epoxidation of propylene is an important industrial intermediate which is produced in large quantities. Molybdenum catalysts for use in such reactions may be produced as described in U.S. Pat. No. 3,453,218 by dissolving molybdenum metal powder in an organic acid such as formic acid containing a small amount of a hydroperoxide such as t-butyl hydroperoxide. Spent catalyst is removed from the process as a solution of molybdenum in a complex brew of organic compounds including process reactants, products and byproducts. The molybdenum content of the organic can vary considerably, between 0.5% molybdenum, or even less, and can be increased, as by distillation of the spent catalyst mixture to 40%, or even more. The consistency of the spent catalyst can vary between that of a mobile liquid to that of a thick, viscous tar. The organic has value as fuel as it can yield 12000–13000 BTU/lb. The value of the spent catalyst would be increased considerably if the molybdenum content could be recovered as metal or in a form suitable for producing a fresh, active catalyst. Hydrometallurgical processes for this purpose have been proposed and are discussed in numerous U.S. Pat. including Nos. 3,453,068, 3,598,519, 3,763,303, 3,931,041, 4,046,852, 4,315,896, 4,317,801, and 4,328,191. The present invention affords a fresh approach to solution of the problem as compared to the teachings of the aforementioned patents.

BRIEF DESCRIPTION OF THE INVENTION

Spent molybdenum-containing catalyst solutions of high organic content are worked up for recovery of molybdenum by heating at a temperature of at least about 400° C. in an atmosphere non-reactive to molybdenum, preferably in a fluid bed. The inert atmosphere preferably is nitrogen and the evolved organics are recovered from the nitrogen off-gas stream as by condensation. A non-pyrophoric powder containing the molybdenum is obtained and the fuel value of the recovered organic is unaffected.

DESCRIPTION OF THE DRAWING

The drawing depicts the thermogravimetric analysis of the solid and liquid fractions of a concentrated spent molybdenum containing catalyst material in terms of weight loss plotted against temperature rise.

DETAILED DESCRIPTION OF THE INVENTION

In carrying out the invention, the molybdenum-containing spent catalyst material which may contain about 0.5% to about 40%, or more molybdenum by weight, with the remainder a mixture of organic compounds such as those resulting from hydroperoxide epoxidation of an olefin, is heated to a temperature of at least about 400° C. and about 1100° C. or higher in a flowing inert atmosphere such as nitrogen. The organic evolves and is carried off with the inert gas stream, from which it can be separated by condensation. The inert atmosphere, non-reactive to molybdenum, prevents evolution of molybdenum as a volatile oxide. Accordingly, the solid residue from the treatment contains all the molybdenum of the initial feed. Preferably, a fluid bed reactor is employed, although a rotary kiln or even a tube-and-boat type furnace may be used. The solid, powdery residue resulting from heating in nitrogen at 400° C. to 600° C. is non-pyrophoric, but contains carbon and oxygen. The oxygen can be reduced to low levels by subsequent heating in hydrogen at temperatures between 600° C. and 1100° C. Such a treatment, however, does not remove the carbon. When hydrogen is used as the flowing non-reactive atmosphere, the temperature should be at least about 900° C., preferably about 1100° C. to yield a non-pyrophoric powder product. The maximum heating temperature is not critical.

Fluid bed furnaces or other furnaces which may be employed in carrying out the invention may be fired externally or internally to supply the heat necessary to carry out the process.

Examples will now be given.

EXAMPLE 1

A spent catalyst comprising, by weight, 92% of a solid tar and 8% of a liquid was found to contain (in the solid fraction) 38% molybdenum, 25% to 30% oxygen, 25% to 30% carbon and 5% hydrogen upon analysis. Metal impurities included 3000 ppm iron, 300 ppm nickel and 300 ppm chromium. No sulfur was present. The liquid fraction was primarily carbon and hydrogen with 0.19% molybdenum.

Portions of the solid and liquid fractions of the spent catalyst were heated to 400° C. in nitrogen to obtain a thermogravimetric analysis (TGA) therefor. The results are depicted graphically in the FIGURE. The solid portion had a 25% weight loss during heat-up to 125° C. Most of the remaining weight loss occurred between 275° C. and 312° C. Total weight loss was 38%. The liquid portion had a 70% weight loss upon heat-up to 100° C. and 97.5% at 400° C.

EXAMPLE 2

Portions of the solid material described in Example 1 weighing about 125 grams were charged into a boat-and-tube furnace having a 3-inch tube diameter tube. The material was heated in a flowing stream of nitrogen under conditions designed to simulate heating in a commercial boat-and-tube furnace, a fluid bed or a rotary kiln. The tube furnace was brought to 425° C., and the boat and contents were charged. The run length was 3 hours. The solid product contained 61.8% Mo, 10.8% C and 27% $O_2$. During the run a small amount of liquid was condensed from the exit gas stream.

EXAMPLE 3

A further run was conducted in nitrogen as described in Example 2 except that the temperature was 800° C. and the run length was 4 hours. The material lost 49.6% in weight and the solid residue contained 83.5% molybdenum, 5.5% carbon, 11% oxygen. Reduction of this material at 1100° C. for 3 hours in hydrogen lowered the oxygen to 560 ppm but the carbon content was 5.6%. A weight loss of 10.3% occurred. A molybdenum content of 94.4% was found, with approximately 0.5% iron. Fisher number was 3.6.

EXAMPLE 4

A run was conducted as described in Example 2 in hydrogen for 3 hours at 600° C. The product contained 10.5% carbon and was pyrophoric. The product was reheated under hydrogen at 1100° C. for three hours without being removed from the furnace and was then found not be be pyrophoric. A total weight loss of 53% was determined and the final product contained 6.5% carbon with 2270 ppm oxygen. Fisher number was 2.1.

EXAMPLE 5

Product from Example 2 was reheated to 700° C. under nitrogen for 8 hours in admixture with molybdenum oxide in a 3:1 ratio of product to oxide. The product contained 75% Mo, 4.1% C and 21% $O_2$ with a 15.9% weight loss. However, calculated on a contained spent material basis, the carbon was still 5.7% indicating the lower carbon content resulted from dilution only.

The foregoing results demonstrates that a solid powdery molybdenum-containing product of high Mo content can be obtained by appropriate treatment of a spent catalyst material. Additionally a condensible organic may also be recovered. A high recovery of Mo is obtained. The powder is useful as an additive to molten metal, e.g., steel, as a source of catalyst material, for return to the molybdenum processing plant, etc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The process for recovering molybdenum dissolved in a spent molybdenum containing tarry epoxidation catalyst mass of high organic content resulting from epoxidation of an olefin, said catalyst being made by dissolving molybdenum in an organic acid containing a small amount of a hydroperoxide and said spent catalyst mass including organic process reactants, products, and byproducts, which comprises heating said catalyst mass having a dissolved molybdenum content of about 0.5% to about 40% in a flowing atmosphere of a gas non-reactive to molybdenum into the temperature range of at least about 400° C. up to about 1100° C. to evolve organic material from said catalyst mass and carry off said organic material in said gas stream, recovering said organic material from the off-gas stream with unaffected fuel value and producing a solid residue containing said molybdenum.

2. The process in accordance with claim 1 wherein said heating is accomplished in a fluid bed reactor through which a stream of nitrogen is passed to provide said atmosphere non-reactive to molybdenum.

3. The processs in accordance with claim 2 wherein said organic material is recovered by condensation from said nitrogen off-gas stream.

4. The process in accordance with claim 1 wherein said heating is accomplished at a temperature of at least about 900° C. in a fluid bed reactor through which a stream of hydrogen is passed to provide the non-reactive atmosphere.

5. The process in accordance with claim 4 wherein said organic material is recovered by condensation from said hydrogen off-gas stream.

6. The process in accordance with claim 4 wherein said heating is conducted at about 1100° C.

* * * * *